United States Patent [19]
Katagiri et al.

[11] Patent Number: 5,489,958
[45] Date of Patent: Feb. 6, 1996

[54] LENS BARREL

[75] Inventors: Moriya Katagiri, Hachioji; Shigeo Hayashi, Okaya; Yukihiko Sugita, Hachioji; Kazuhiro Satoh; Hiroshi Akitake, both of Sagamihara, all of Japan

[73] Assignee: Olympus Optical Co., Ltd., Tokyo, Japan

[21] Appl. No.: 330,119

[22] Filed: Oct. 27, 1994

Related U.S. Application Data

[63] Continuation of Ser. No. 22,738, Feb. 24, 1993, abandoned.

[30] Foreign Application Priority Data

Feb. 25, 1992 [JP] Japan .................. 4-038068

[51] Int. Cl.⁶ .................................................. G03B 1/18
[52] U.S. Cl. .................... 354/195.12; 354/187
[58] Field of Search ................... 354/187, 195.11, 354/195.12, 195.13, 195.1

[56] References Cited

U.S. PATENT DOCUMENTS

| | | | |
|---|---|---|---|
| 4,410,253 | 10/1983 | Tsuboi | 354/202 X |
| 4,721,972 | 1/1988 | Wakabayashi | 354/195.1 |
| 4,752,796 | 6/1988 | Tsukahara et al. | 354/202 X |
| 4,771,303 | 9/1988 | Matsumoto et al. | 354/195.12 |
| 4,847,648 | 7/1989 | Yamaguchi et al. | 354/195.12 |
| 4,864,338 | 9/1989 | Wakabayashi | 354/195.12 X |
| 5,034,762 | 7/1991 | Kohmoto | 354/195.12 |

FOREIGN PATENT DOCUMENTS 4-81829  3/1992  Japan .

*Primary Examiner*—Howard B. Blankenship
*Attorney, Agent, or Firm*—Louis Weinstein

[57] ABSTRACT

A lens barrel comprises a barrier provided at a front aperture of a photographing lens, a barrier driving mechanism for opening and closing the barrier, a lens driving mechanism for moving at least one lens group in an optical-axis direction, a driving device for operating the lens driving mechanism and the barrier driving mechanism, and a driving force switching device for transmitting driving force of the driving device to a lens driving mechanism at a state capable of photographing and for transmitting driving force of the driving device to a barrier driving mechanism at a state incapable of photographing linked with the movement of the photographing lens from a state capable of photographing to a state incapable of photographing.

54 Claims, 6 Drawing Sheets

LENS BARREL

This is a continuation of application Ser. No. 08/022,738, filed Feb. 24, 1993.

BACKGROUND OF THE INVENTION

1. Field of the Invention

The present invention relates to a lens barrel and, more particularly, to a lens barrel having a protection cover, that is, a lens barrel, which is openably and closably provided at an aperture portion of the front of a lens barrel of a camera or the like for protecting a photographing lens.

2. Related Art Statement

The applicant of the present invention has previously proposed a barrier driving mechanism for driving a lens protection cover, what is known as a lens barrel, to be openably and closably provided at the front end of a lens barrel in Japanese Patent Laid Open Application Hei/ 4(1992)-81829.

In view of different amounts of lens movement for focusing between a wide area and telephoto area, the proposed invention is to open and close a barrier by means of moving lens operation at the portion of the different amounts of the lens movement between the wide area and telephoto area.

However, in the prior art of this proposal, means for transmitting driving force from a lens driving mechanism to a barrier driving mechanism causes a ring member having an arm member to rotate. Also, in the case of only the movement of an ordinary lens, a transmitting member is driven, so that there were problems of slow lens movement and of requiring a large motor for driving the transmitting member.

SUMMARY OF THE INVENTION

In order to solve the aforesaid problems, a main object of the present invention is to provide a lens barrel which is formed to transmit a driving force for starting a lens driving mechanism to a barrier driving mechanism only when a barrier opening and closing operation is needed and not to transmit the force to the barrier driving mechanism when an ordinary lens is moved.

Another object of the present invention is to provide a lens barrel which opens a lens barrier by means of the forward movement of the lens barrel from a collapsing position where the lens barrel is sunk in a camera body to a position where a picture can be taken, and which closes the lens barrier by means of a sinking movement for moving the lens barrel to the aforesaid collapsing position where a picture cannot be taken.

Further, another object of the present invention is to provide a lens driving apparatus having switching means for selectively switching the driving force of a driving source from barrier driving means for opening and closing a lens barrier to lens driving means for moving the lens in the optical-axis direction in order to focus the lens.

If the present invention is explained briefly, driving force for starting a lens driving mechanism in which a driving source causes a lens to move in the optical-axis direction is switched from a barrier driving mechanism to a lens driving mechanism only when a lens barrel which requires barrier opening and closing movement is sunk, and a transmission route of the driving force is switched from the lens driving mechanism to the barrier driving mechanism by the operation for moving the lens barrel to a state where a picture can be taken so that the transmission route to the barrier driving mechanism is disconnected when an ordinary lens moves.

These objects and advantages of the present invention will be further apparent from the following detailed explanation.

According to the present invention, a driving force transmission route is switched from a lens driving mechanism to a barrier driving mechanism in a state where a focus detecting unit is connected to a barrier unit which has the barrier driving mechanism including a barrier opening and closing mechanism, so that a barrier member is opened and closed. Then, in a state where a picture can be taken, the driving force transmission route to the barrier driving mechanism is switched from the barrier driving mechanism to the lens driving mechanism so that a lens is driven. Therefore, when an ordinary lens is driven, loads except for that of the lens driving are so small that the time required for driving a lens is not lost and a large motor is not needed. Thus, it has an effect that the lens driving mechanism can be small.

DETAILED DESCRIPTION OF PREFERRED EMBODIMENT

Figure 3:
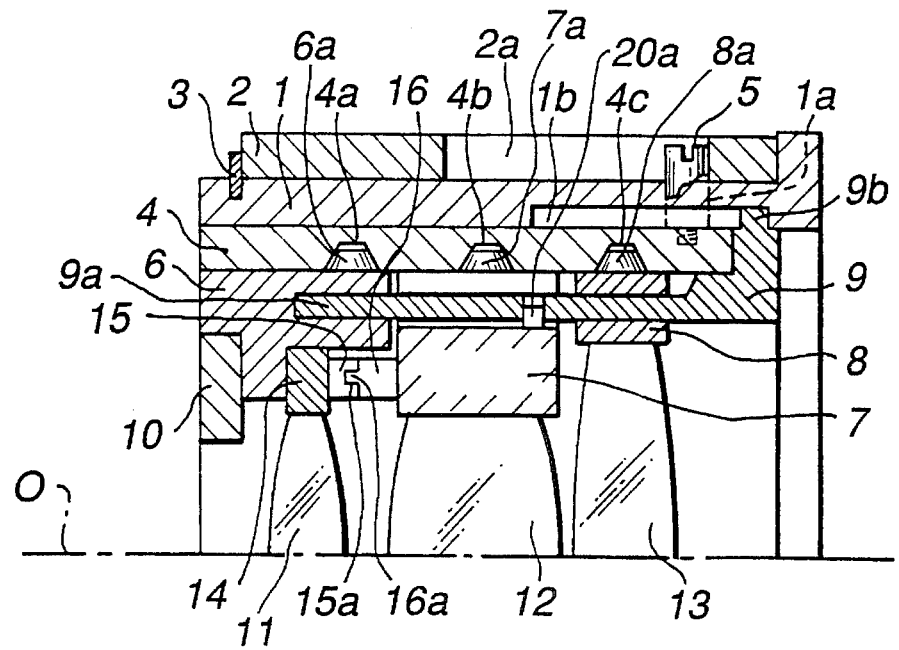
FIG. 3 is a sectional view of only an upper part of the lens barrel showing a lens sunk state in the lens barrel of the aforesaid embodiment.

FIG. 3 is a sectional view of an upper part of a lens barrel showing an embodiment of the present invention.

In the lens barrel, a zoom operation ring 2 is rotatably fitted to the outer peripheral surface of a fixed cylinder 1. Straight grooves 2a are provided on trisected positions of the zoom operation ring 2 so as to guide a driving pin 5 which will be described later. A forward movement along an optical axis 0 is regulated (i.e., prevented) by a C ring 3 which is fitted into the outer peripheral surface of the tip of the fixed cylinder 1. A backward movement along the optical axis 0 is prevented by a flange facing outside (i.e., radially outward) provided on the fixed cylinder 1.

A zoom ring 4 is rotatably fitted to the inner peripheral surface of the fixed cylinder 1. The driving pin 5 is fixed in the zoom ring 4 and stands facing the outward radial direction. The driving pin 5 goes through a zoom cam groove slot 1a provided on the fixed cylinder 1 and fits into one of the straight grooves 2a of the zoom operation ring 2. Therefore, when the zoom operation ring 2 is rotated around the optical axis 0, the zoom ring 4 moves back and forth in the optical-axis direction while rotating around the optical axis 0.

Then, a barrier unit 6, focus detecting unit 7 and third lens holding frame 8 are fitted on the inner peripheral surface of the zoom ring 4 in the order from the front and so that the barrier unit 6, focus detecting unit 7 and third lens holding unit 8 can move only in the axial direction. Driving pins 6a, 7a and 8a are arranged in the trisected positions of the outer peripheral surface of the barrier unit 6, focus detecting unit 7 and third lens holding unit 8, respectively. These pins 6a, 7a and 8a fit into cam groove slots 4a, 4b and 4c perforated into the inner peripheral surface of the aforesaid zoom ring 4, respectively. Keys 9a of a float key 9, having a base arranged on the rear end surface of the zoom ring 4, are inserted into the barrier unit 6, focus detecting unit 7 and third lens holding frame 8 (see FIG. 2).

Figure 2:
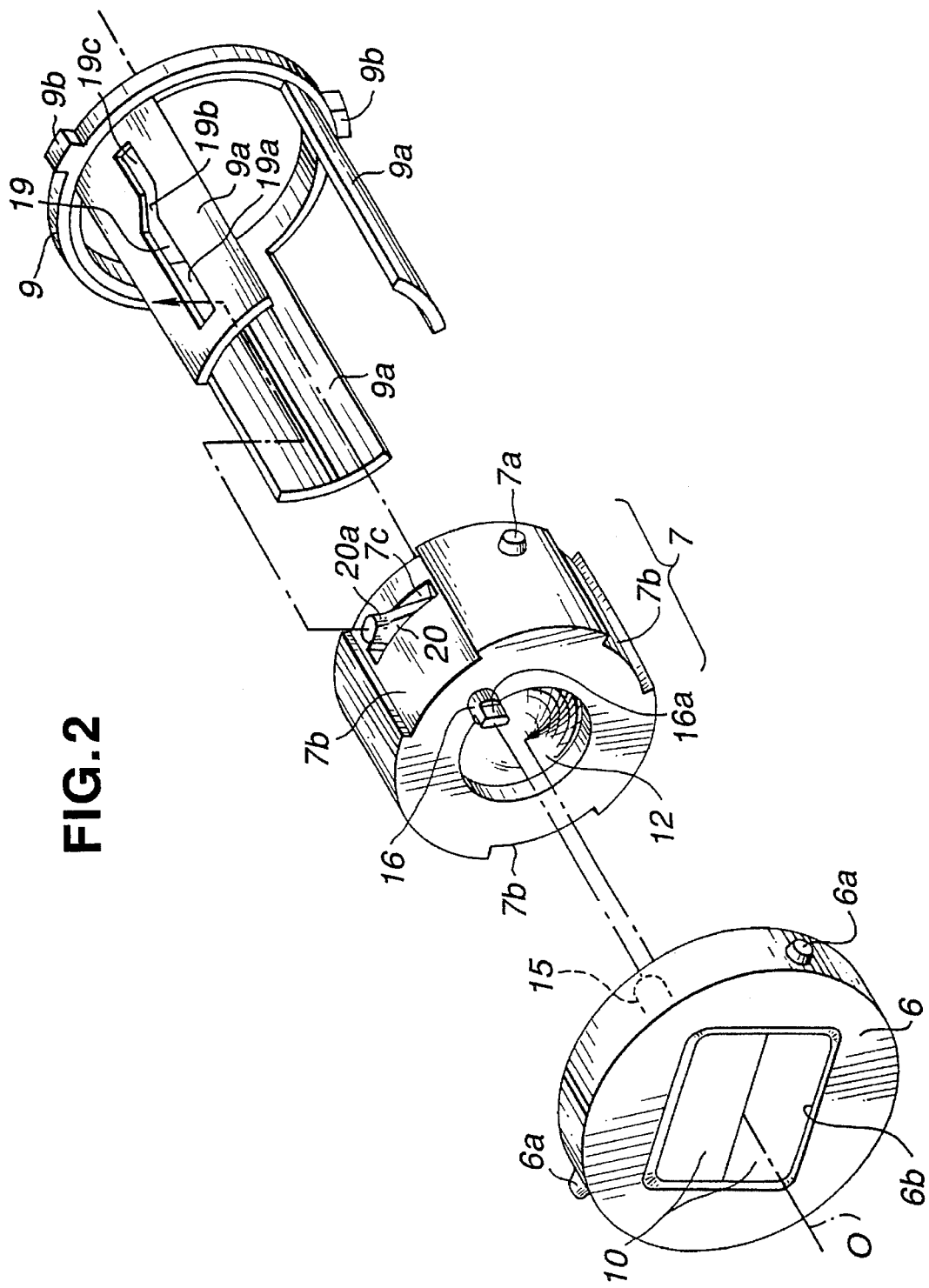
FIG. 2 is a perspective view showing a relation among a focus detecting unit, a barrier unit and a float key in the aforesaid lens barrel.

As shown in FIG. 2, the base of the float key 9 is formed as a ring. The keys 9a, extended in the forward direction, are formed in trisected positions of the front thereof. The keys 9a are inserted into the barrier unit 6, focus detecting unit 7 and third lens holding frame 8 from the rear thereof. As shown in FIG. 3, integral projections 9b are projected in the trisected positions of the outer peripheral surface of the ring base and fitted into guide grooves 1b perforated into the inner peripheral surface of the fixed cylinder 1 in the optical-axis direction, so that rotation of float Key 9 around the optical axis is prevented, guide grooves 1d causing float key 9 to follow the movement of the zoom ring 4 in the optical-axis direction and move back and forth only in the optical-axis direction. Accordingly, the barrier unit 6, focus detecting unit 7 and third lens holding frame 8 move back and forth only in the optical-axis direction when the zoom ring 4 rotates, by means of the keys 9a.

The barrier unit 6 has a barrier driving mechanism (see FIG. 9) including barrier blades 10 arranged at the tip of the barrier driving mechanism and a barrier opening and closing mechanism. A first lens holding frame 14 supporting a first lens group 11 is arranged on the inner peripheral surface near the front of the barrier driving mechanism. In addition, a rotatable coupler 15 projecting in the rear direction on the rear end of the barrier driving mechanism is arranged. A second lens group 12 is movably held in the optical-axis direction in the focus detecting unit 7. At the same time, in the focus detecting unit 7, a lens driving mechanism for moving the second lens group 12 in the optical-axis direction to adjust a focal point, driving force switching means, a motor M which is a driving source (see FIG. 1) and a shutter unit (not illustrated) are arranged. A driver 16 is rotatably projected in a position facing the coupler 15 on the front side of the focus detecting unit 7. On the third lens holding frame 8, a third lens group 13 is supported.

Figure 4:
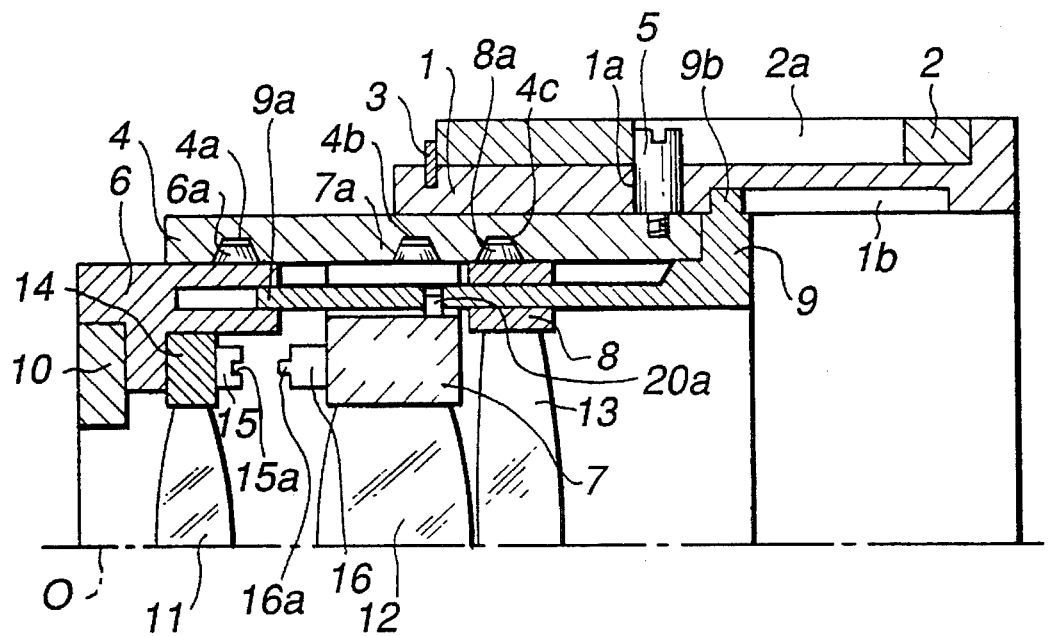
FIG. 4 is a sectional view of only an upper part of the lens barrel of the aforesaid embodiment showing a state in which a picture can be taken.

On the driver 16 (see FIGS. 1, 2 and 9), a connecting projection 16a is formed at the tip of a short column axis. The shape of the section of the projection 16a is rectangle. As shown in FIG. 3, when the lens is sunk, the projection 16a fits into a connecting concave portion 15a having a rectangular shape, so that projection 16a and concave portion 15a can be coupled. That is, both form a jaw clutch or claw coupling. In this coupled state, the driving force of the motor M in the focus detecting unit 7 can be transmitted to the barrier driving mechanism in the barrier unit 6. Nevertheless, as shown in FIG. 4, the driver 16 and the coupler 15 are separated because of the difference between the moving amounts of the first lens group 11 and second lens group 12 using the cam groove slots 4a and 4b in a state where the lens groups 11, 12 and 13 are moved to a photographing state by means of the zoom ring 4.

Figure 5:
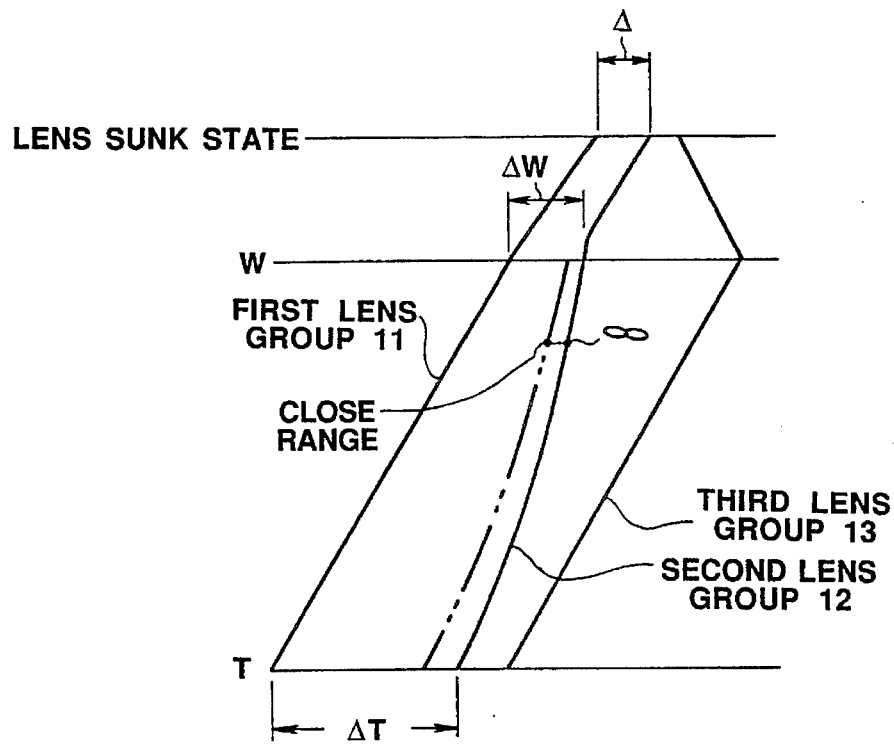
FIG. 5 is a diagram showing an example of a moving amount of the first lens group to the third lens group.

FIG. 5 shows an example of the amounts of the movement of the first lens group 11, second lens group 12 and third lens group 13 using the cam groove slots 4a, 4b and 4c. That is, if the interval between the barrier unit 6 and the focus detecting unit 7 in a lens sunk state is $\Delta$, and the interval at a W state (wide-angle state) is $\Delta W$ and the interval at a T state (telephoto state) is $\Delta T$, the relation between the intervals is shown as $$\Delta < (\Delta W - \Delta T).$$

Thus, the driver 16 and the coupler 15 are coupled at a lens sunk state and separated at a photographing state in a W position to T position. Further, in the aforesaid photographing state, the second lens group 12 adjusts a distance from a close range to infinite range for operating a focus by means of the lens driving mechanism.

FIG. 2 shows the relation among the focus detecting unit 7, barrier unit 6 and float key 9.

In the barrier unit 6, barrier blades 10, barrier driving mechanism including the barrier opening and closing mechanism and the first lens group 11 are arranged in a housing body formed of a short cylinder. An exposure aperture window 6b of a rectangular shape with long sides is perforated into the surface of the housing body and a pair of barrier blades 10 arranged on the inside of an exposure aperture window 6b causes the window 6b to open and close. In the rear of the barrier blades 10, a barrier opening and closing mechanism which will be described later and a barrier driving mechanism (see FIG. 9) are arranged. The keys 9a are inserted into the inside of the housing body from the rear thereof. The driving pin 6a is fixed on the outer peripheral surface of the housing body.

In the focus detecting unit 7, the second lens group 12, a lens driving mechanism which will be described later, driving force switching means, a motor M which is a driving source (see FIG. 1) and a shutter unit (not illustrated) are arranged in the relatively long cylinder. Relatively wide concave grooves 7b are provided in trisected positions on the outer peripheral surface of the housing body. The keys 9a are inserted into the concave grooves 7b. A partly arc-like through-hole 7c is provided in the peripheral direction of one of the concave grooves 7b. The tip of a switching arm 20 (see FIG. 1) described later extends through the through hole 7c, so that a head 20a thereof is projected.

At the same time, the keys 9a to be inserted into the concave grooves 7b are formed with substantially the same width as that of the grooves 7b. A switching cam slot 19 is perforated into one of the keys 9a which are inserted into the concave grooves 7b where the head 20a is projected. The head 20a fits into the switching cam slot 19. The switching cam slot 19 is a long and narrow through hole which is wider than that of the head 20a. The switching cam slot 19 consists of a lens moving portion 19a being holed at the tip of one of the keys 9a, a barrier opening and closing portion 19c which changes its direction from the lens moving portion 19a to the peripheral direction by the width of the peripheral direction of the cam slot 19 and the portion 19c is provided at the base of the float key 9, and a switching portion 19b formed of an inclined hole connecting the barrier opening and closing portion 19c and the lens moving portion 19a.

Figure 6:
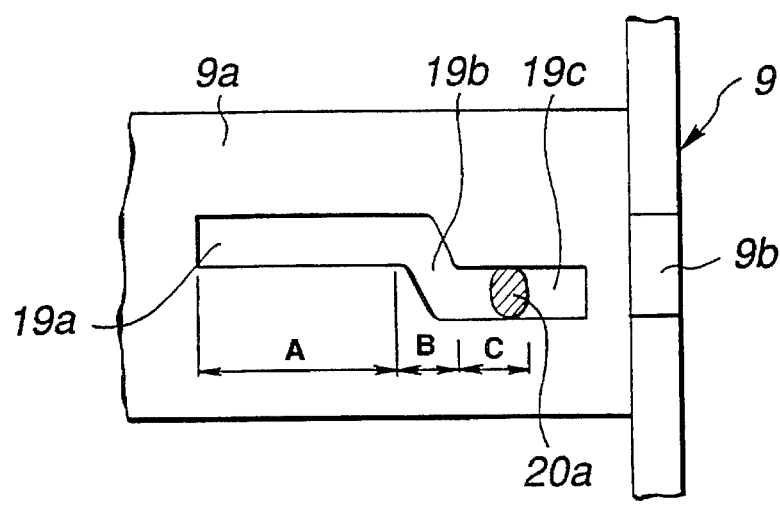
FIG. 6 is an enlarged plan view of a switching cam slot in driving force switching means.

FIG. 6 shows the relation between the switching cam slot 19 and the head 20a. When the head 20a of the switching arm 20 positioned within a moving range A of the lens moving portion 19a, driving force switching means has been switched to a state where driving force is transmitted to the lens driving mechanism which is described later, so that the camera is in a state being able to photograph. When the head 20a is positioned within a moving range C of the barrier opening and closing portion 19c, the driving force switching means is switched to a state where driving force is transmitted to the barrier driving mechanism described later, so that a lens barrel is in a sunk state. When the head 20a is positioned within a range B of the switching portion 19b, the driving force switching means described later becomes a switched state. Also, the driving pin 7a is fixed on the outer peripheral surface of the aforesaid cylinder. The driver 16 is projected from the front thereof.

Figure 1:
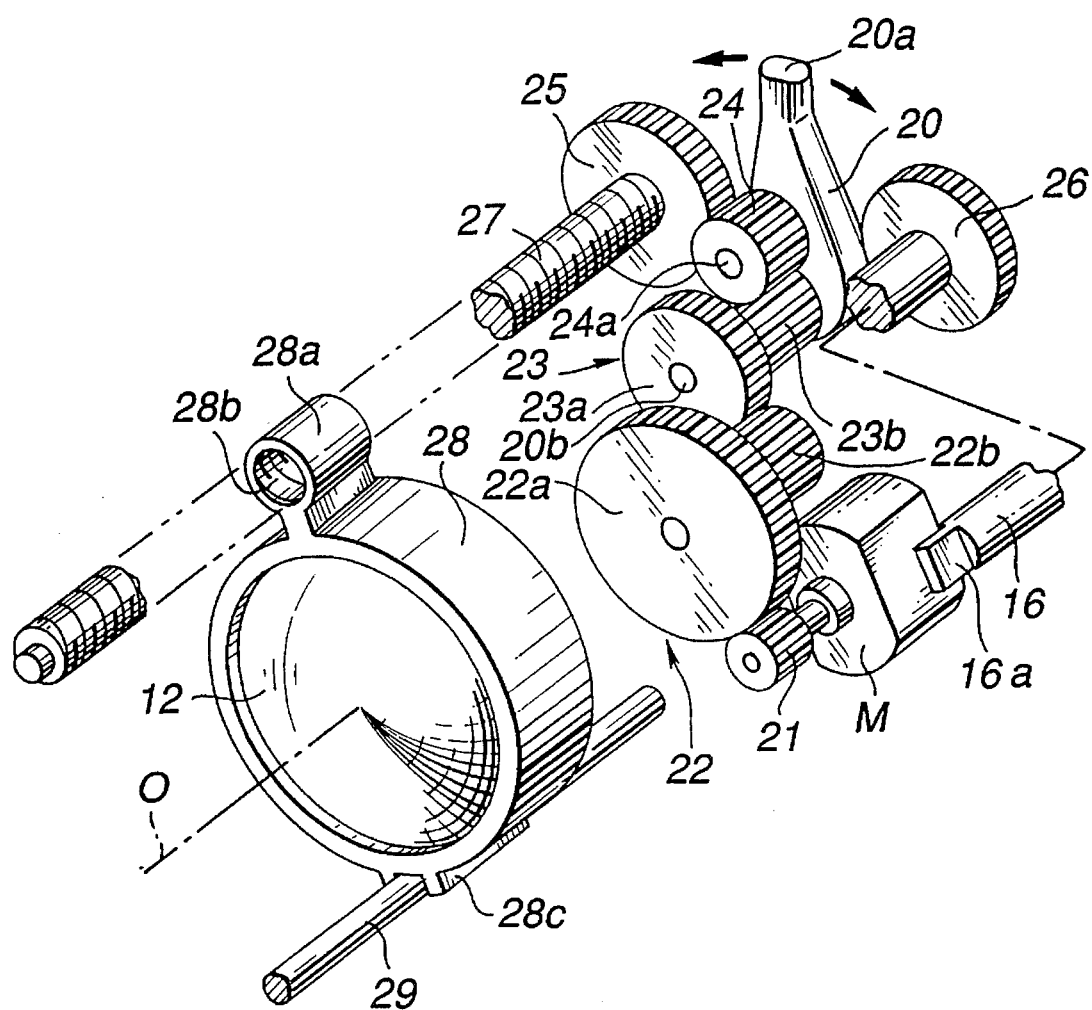
FIG. 1 is a perspective view of a lens driving mechanism, driving force switching means and a driving source in a lens barrel showing an embodiment of the present invention.

FIG. 1 shows the motor M which is a lens driving mechanism arranged in the aforesaid cylinder, driving force switching means and driving source. An output gear 21 of the motor M which is a driving source meshes with a large diameter gear 22a of a stepped gear 22 of a decelerating gear train consisting of the stepped gears 22 and 23. A small diameter gear 22b of the stepped gear 22 meshes with a large diameter gear 23a of a stepped gear 23. A small diameter gear 23b of the stepped gear 23 meshes with a switching gear 24. A supporting shaft of the stepped gear 23 is formed of a pivot 20b which is common to an arm supporting shaft going through the swinging center of the base of the switching arm 20. A supporting shaft 24a of the switching gear 24 stands on the switching arm 20.

The switching arm 20 is rotatably supported by the pivot 20b. Accordingly, the switching gear 24 rotates around the small diameter gear 23b of the stepped gear 23 with the rotation of the switching arm 20. That is, the small diameter gear 23b is a sun gear and the switching gear 24 is a planet gear. Then, both constitute a planet gear mechanism. On both sides of the switching gear 24, driven gears 25 and 26 are arranged. One driven gear 25 of the driven gears 25 and 26 is used to drive a lens and is arranged on the left side from the front of the lens barrel. When the switching arm 20 rotates around its supporting shaft in the counter-clockwise direction (in FIG. 1), the switching gear 24 meshes with the driven gear 25 so that the driving force of the motor M is transmitted to a lead screw 27. The other driven gear 26 is used to open and close a barrier and arranged on the right side from the front of the lens barrel. When the switching arm 20 rotates around its supporting shaft in the clockwise direction (in FIG. 1), the switching gear 24 meshes with the driven gear 26 so that the driving force of the motor M is transmitted to the driver 16.

Then, the driven gear 25 is arranged in parallel with the optical axis 0 and is fixed to the rear end of the lead screw 27 which moves the second lens group 12 back and forth in the optical-axis direction. The front end of the lead screw 27 is rotatably supported against an immobile member. A female screw 28b provided in a driving portion 28a of the second lens holding frame 28, which supports the second lens group 12, is spirally fitted to the middle of the lead screw 27. The driving portion 28a is integrated with a small diameter cylinder through a coupling on the outside of the second lens holding frame 28. The female screw 28b is carved inside of the frame 28. A fork-like guide receiving portion 28c is formed in a position of the opposite diameter side of the driving portion 28a on the second lens holding frame 28. The guide receiving portion 28c fits on a guiding shaft 29 arranged in parallel with the optical axis. At the same time, the driven gear 26 is fixed to the rear end of the driver 16 which is rotatably fitted to the immobile member.

Figure 9:
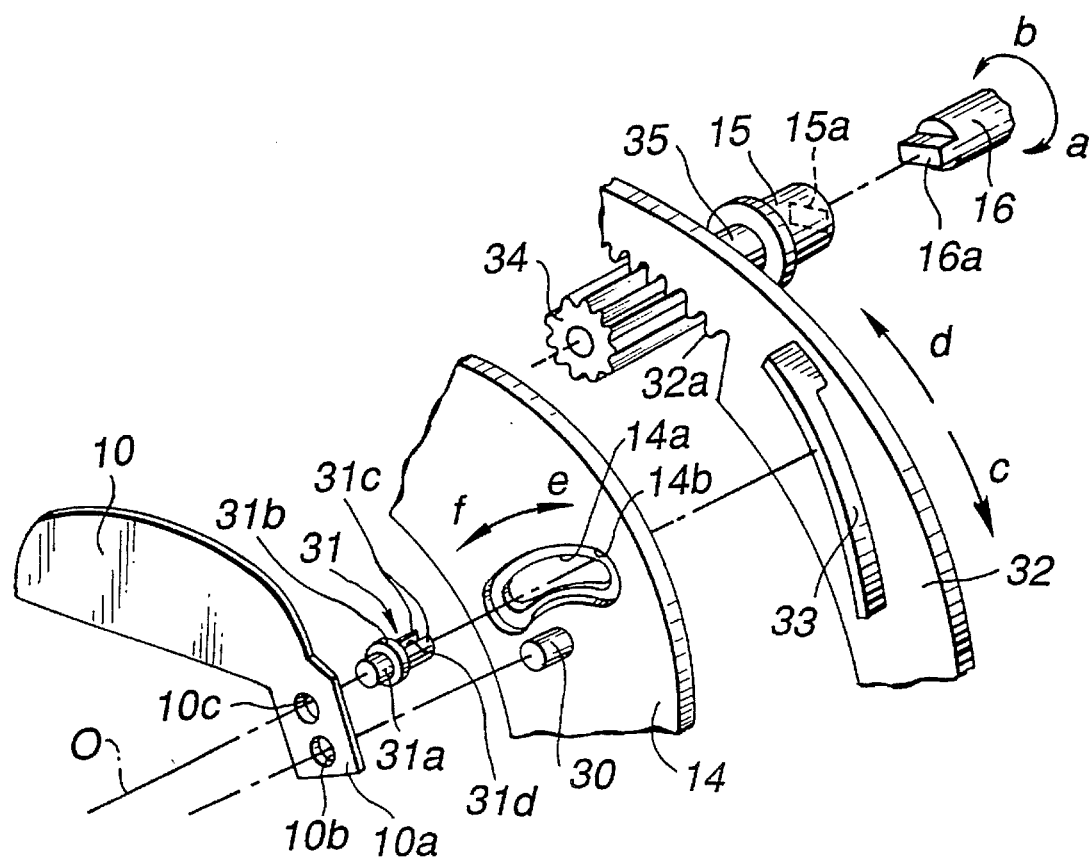
FIG. 9 is an enlarged perspective view showing a barrier blade, a barrier opening and closing mechanism and a barrier driving mechanism.

Next, the barrier, which is a shading member and arranged in the barrier unit 6 and a barrier driving mechanism, which is a shading member driving mechanism will be explained using FIG. 9. The barrier blades 10 are composed of a pair of thin board members which are symmetrically opposed in the up and down direction. The front shape of the board member is elliptical. In FIG. 9, only the upper barrier blade 10 and barrier opening and closing mechanism are described in FIG. 9, simplicity. Also, the lower barrier blade 10 and barrier opening and closing mechanism are symmetrically arranged under the barrier driving mechanism.

The proximal ends of the barrier blades 10 further project and form a supporting portion 10a. A fitting hole 10b and a rotation hole 10c are perforated through the supporting portion 10a. The fitting hole 10b perforated into the outside of the supporting portion 10a is rotatably fitted into a pivot 30 fixed on the front side of the first lens holding frame 14 and, therefore, the rotation hole 10c perforated into the inside of the supporting portion 10a is tightly fitted to an outer shaft portion 31a of a driving shaft 31.

The driving shaft 31, a through hole 14a which will be stated below and an elastic arm portion 33 form the barrier opening and closing mechanism. The driving shaft 31 has a flange 31b at the middle thereof and has the outer shaft portion 31a on the outside thereof and an inner shaft portion 31c inside thereof. The inner shaft 31c has a fork portion 31d. The inner shaft 31c is inserted into the through hole 14a of a partly arcuate slot perforated into the first lens holding frame 14. The fork portion 31d is arranged so as to sandwich the elastic arm portion 33 of the driving ring 32 arranged within the barrier unit 6.

The elastic arm portion 33 is a strip-like elastic board which is gently bent. The elastic arm portion 33 stands on the front side of the driving ring 32 and extends in the optical-axis direction and is arranged in such a way that the base of the elastic arm portion 33 is fixed so as to be inclined from the outer rim to the inner rim of the ring front. A step portion 14b is formed around the through hole 14a on the front side of the first lens holding frame 14. The flange 31b of the driving shaft 31 is loosely fitted into the step portion 14b.

The driving ring 32, an internal gear 32a stated later and pinion gear 34 form the barrier driving mechanism. The driving ring 32 is rotatably arranged within the barrier unit 6 to open and close the barrier blades 10 by operating the barrier opening and closing mechanism by means of the rotation of the ring 32. That is, the internal gear 32a is carved on the inner rim of the driving ring 32. The pinion gear 34 meshes with the internal gear 32a. The internal gear 32a is fixed on the end of a fitting shaft 35 in which the coupler 15 is fixed on the other end.

Thus, the barrier blades 10 formed in this way and the barrier opening and closing mechanism composed of the driving shaft 31, pivot 30, through hole 14a and elastic arm portion 33 are arranged under the barrier driving mechanism as a vertical pair.

Next, the operation of the lens barrel formed in this way of the present embodiment will be explained.

Figure 8:
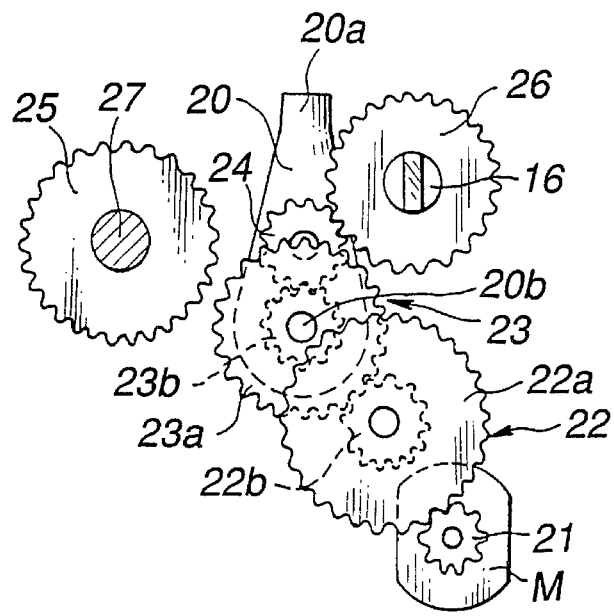
FIG. 8 is an elevational view showing a state in which a driving force transmitting system is switched from a lens driving mechanism to a barrier driving mechanism by driving force switching means.

In the sunk state (collapsing state) of the lens barrel shown in FIG. 3 when the camera is not used, the interval between the barrier unit 6 and tile focus detecting unit 7 is Δ as explained above. Therefore, the coupler 15 and the driver 16 are coupled and the head 20a of the switching arm 20 is positioned within the moving range C (see FIG. 6) of the barrier opening and closing portion 19c of the switching cam slot 19, so that the switching arm 20 rotates around its pivot in the clockwise direction (in FIG. 1) and the driving force switching means is switched to the state where the driving force is transmitted to the barrier driving mechanism as shown in FIG. 8.

In this state, when the main switch (not illustrated) of the camera is switched on, the motor M is started. Then, the rotation driving force of the motor M is transmitted from the output gear 21 to the switching gear 24 through the decelerating gear train composed of the stepped gears 22 and 23. Since the switching gear 24 meshes with the driven gear 26 by means of the rotation of the switching arm 20 in the clockwise direction (in FIG. 1), the driven gear 26 rotates to rotate and drive the driver 16. Because the driver 16 is coupled to the coupler 15, when the driver 16 rotates in the clockwise direction as shown in FIG. 9, the coupler 15 and the pinion gear 34 rotate in the clockwise direction. Then, the driving ring 32 rotates in the clockwise c direction around the optical axis 0 by means of the interval gear 32a meshing with the pinion gear 34.

When the driving ring 32 rotates, the elastic arm portion 33 rotates together, so that the driving shaft 31 is guided by the elastic arm portion 33 and moves outward from the barrel in the through hole 14a, that is, in the arrow e direction. Accordingly, if the driving shaft 31 moves in the e direction, the barrier blades 10 rotate around the pivot 30 in the clockwise direction. Thus, the aperture window 6b is opened to be in a state being able to be exposed. Then, when the window is opened, the drive of the motor M is stopped.

Next, the zoom operation ring 2 is driven and rotated, and then, the first lens group 11, second lens group 12 and third lens group 13 are moved from the lens sunk state to the position where a picture can be taken as shown in FIG. 4. At this moment, because the moving amount of the barrier unit 6 is larger than that of the focus detecting unit 7, the coupler 15 is separated from the driver 16, so that the coupling between the coupler 15 and the driver 16 is cut. Further, because the moving amount of the focus detecting unit 7 is larger than that of the zoom ring 4, the head 20a of the switching arm 20 within the moving range C (see FIG. 6) of the barrier opening and closing portion 19c of the switching cam slot 19 passes through the range B of the switching portion 19b and moves to the moving range A of the lens moving portion 19a, the driving force switching means is switched to transmit the driving force to the lens driving mechanism.

Figure 7:
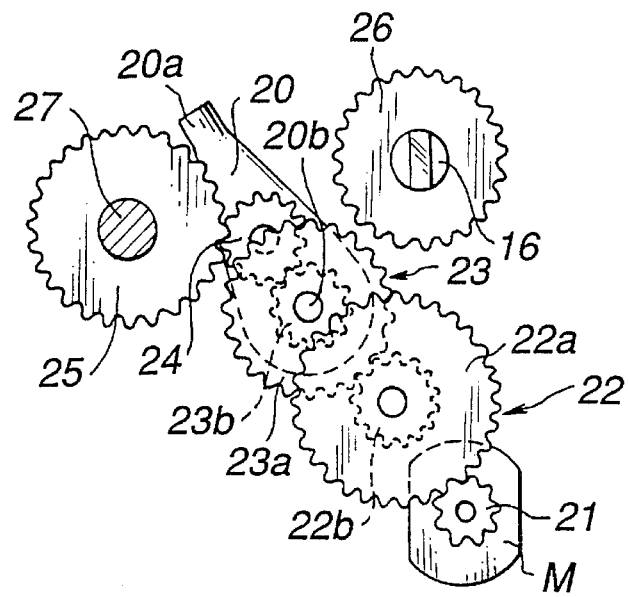
FIG. 7 is an elevational view showing a state in which a driving force transmitting system is switched from a barrier driving mechanism to a lens driving mechanism by driving force switching means.

That is, when the head 20a moves to the lens moving portion 19a, the switching arm 20 rotates around the pivot 20b in the clockwise direction (in FIG. 1). Therefore, the switching gear 24 meshes with the driven gear 25 by means of the counter-clockwise rotation of the switching arm 20 as shown in FIG. 7.

Accordingly, in this state, when the motor M is driven, focus operation is carried out. That is, when the motor M is started, its rotation driving force is transmitted from the output gear 21 to the switching gear 24 through the decelerating gear train composed of the stepped gears 22 and 23, and then, the driven gear 25 meshing with the switching gear 24 is driven and rotated, so that the lead screw 27 is rotated. As a result, the driving portion 28b of the second lens holding frame 28 moves in the optical-axis direction. Then, the second lens holding frame 28 moves to perform the focus operation by means of the second lens group 12. Also, before and after the focus operation, the camera is zoomed. Then, a shutter release operation is performed to finish photographing.

After photographing, when the main switch is switched off, the zoom operation ring 2 reversely rotates and the zoom ring 4 rotates in the opposite direction to the direction at the time when the lens is moved, so that the first lens group 11, second lens group 12 and third lens group are moved toward the lens sunk position. At this moment, the moving amount of the barrier unit 6 is larger than that of the focus detecting unit 7. Therefore, the coupler 15 in the lens sunk position is coupled with the driver 16 as shown in FIG. 3. Also, the moving amount of the focus detecting unit 7 is larger than that of the zoom ring 4. Thus, the head 20a of the switching arm 20 within the moving range A (see FIG. 6) in the lens moving portion 19a of the switching cam slot 19 passes through the range B of the switching portion 19b and moves to the moving range C (see FIG. 6) of the barrier opening and closing portion 19c. The driving force switching means is switched to transmit the driving force to the barrier driving mechanism.

In other words, when the head 20a moves to the barrier opening and closing portion 19c, the switching arm 20 rotates in the clockwise direction (in FIG. 1) around the pivot 20b, so that the switching gear 24 meshes with the driven gear 26 again by means of the rotation of the switching arm 20 in the clockwise direction as shown in FIG. 8.

In this state, the motor M is driven for a prescribed time. As a result, the rotation driving force is transmitted from the output gear 21 to the switching gear 24 through the decelerating gear train composed of the stepped gears 22 and 23. The switching gear 24 meshes with the driven gear 26 (see FIG. 8) by means of the rotation of the switching arm 20 in the clockwise direction (in FIG. 1). Thus, the driven gear 26 rotates to drive and rotate the driver 16. Since the driver 16 is coupled with the coupler 15, the coupler 15 and the pinion gear 34 rotate in the counter-clockwise direction when the driver 16 rotates in the counter-clockwise b direction as shown in FIG. 9. Then, the driving ring 32 rotates in the counter-clockwise d direction around the optical axis 0 by means of the internal gear 32a meshing with the pinion gear 34.

When the driving ring 32 rotates in the d direction, the elastic arm portion 33 rotates together. Therefore, the driving shaft 31 is guided by the elastic arm portion 33 to move to the inside of the barrel, that is, in the arrow f direction through the through hole 14a. Accordingly, if the driving shaft 31 moves in the f direction, the barrier member 10 rotates around the pivot 30 in the counter-clockwise direction, so that the exposure aperture window 6b is covered with the barrier blades 10 and the lens is protected. Then, when the window 6b is covered, the drive of the motor M is stopped.

The above mentioned operation is the operation of the lens barrel in this embodiment. However, the present invention can be applied not only to a lens barrel in which a cam is two-stepped for zooming as in this embodiment, but also to the whole structure of the barrel having a cam member in which a driving force transmitting route to the lens driving mechanism is switched to a barrier driving mechanism. In addition, a barrier opening and closing mechanism is not limited to the aforesaid operation. It can be easily applied to an apparatus which can be opened and closed by obtaining the driving force.

What is claimed is:

1. A lens barrel comprising:

an aperture provided at a front of a photographing optical system movable between a state capable of photographing and a state incapable of photographing;

a shading means rotatably provided just behind the aperture;

a shading means driving mechanism for opening and closing the shading means;

a lens group driving mechanism for moving backward and forward at least one lens group in an optical axis direction;

a single driving source for selectively operating said shading means driving mechanism and said lens group driving mechanism in a mutually exclusive fashion; and switching means for switching a driving force of said driving source from said lens driving mechanism to said shading means driving mechanism responsive to a shift of said photographing optical system in a direction of the optical axis from a state capable of photographing to a state incapable of photographing by said photographing optical system.

2. The lens barrel according to claim 1 wherein said state incapable of photographing is a collapsing state of said photographing optical system and said state capable of photographing is a moving forward state of at least one portion of said photographing optical system from said collapsing state.

3. The lens barrel according to claim 1 wherein said aperture is formed in a flange provided at a forward end of said lens barrel.

4. The lens barrel according to claim 1 wherein said shading means is provided on a member forming said aperture.

5. The lens barrel according to claim 1 wherein at least one lens group is moved backward and forward in an optical-axis direction for focusing.

6. A lens barrel comprising:

barrier means selectively openably and closably provided just behind a front aperture of a movable photographing optical system;

a barrier driving mechanism for opening and closing the barrier means;

a lens group driving mechanism for selectively moving at least one lens group backward and forward in an optical-axis direction within said photographing optical system;

a driving source for operating said barrier driving mechanism and said lens group driving mechanism; and transmitting means for selectively transmitting driving force of said driving source to said lens group driving mechanism responsive to movement of the optical system to a state capable of photographing for to said barrier driving mechanism when the optical system is moved to a state incapable of photographing.

7. The lens barrel according to claim 6 wherein at least one lens group is movable backward and forward in an optical-axis direction for focusing.

8. A lens barrel comprising:

an aperture provided at a front of a photographing optical system;

barrier means movable between a state of covering said aperture and a state of uncovering said aperture;

a barrier driving mechanism for moving said barrier means;

a lens group driving mechanism for moving at least one lens group backward and forward in an optical-axis direction within said photographing optical system;

a driving source for selectively operating said barrier driving mechanism and said lens group driving mechanism; and switching means for switching a driving force transmitted direction of said driving source from said lens driving mechanism to said barrier driving mechanism responsive to a shift of said optical system in a direction of the optical axis from a state capable of photographing to a state incapable of photographing by said photographing optical system.

9. A lens barrel comprising:

a single driving source;

barrier means movable between a state covering an aperture and a state uncovering an aperture provided at a front of a photographing optical system having at least one movable lens group;

first connecting means for connecting said barrier means to said driving source;

second connecting means for connecting said lens group to said driving source for moving said lens group backward and forward in an optical-axis direction within said photographing optical system; and switching means for switching a driving force of said driving source from said first connecting means to said second connecting means responsive to a shift of the optical system in a direction of the optical axis from a state capable of photographing to a state incapable of photographing by said photographing optical system.

10. A lens barrel comprising:

a single driving source;

an aperture provided at a front of a photographing optical system;

barrier means movable between a state covering the aperture and a state uncovering the aperture;

first connecting means for connecting said barrier means and said driving source;

second connecting means for connecting a lens group of said optical system and said driving source for selectively moving at least one lens group backward and forward in an optical-axis direction within said photographing optical system; and switching means for switching a driving force of said driving source between said first connecting means and said second connecting means responsive to a change of position of at least one lens group of said photographing optical system.

11. A camera comprising:

a single driving source;

a photographing optical system;

barrier means movable between a state of covering an aperture and a state of uncovering an aperture provided at a front of said photographing optical system;

said photographing optical system including at least one lens group changing a state of said photographing optical system by selectively moving backward and forward in an optical-axis direction; and transmitting means for selectively transmitting driving force of said driving source to one of said barrier means and said lens group responsive to a state change of the photographing optical system.

12. The camera according to claim 11 wherein said state change of the camera is performed on a basis of change of an on-state of a power source.

13. The camera according to claim 11 wherein at least one lens group of said photographing optical system changes a focal position of said photographing optical system by moving backward and forward in an optical-axis direction.

14. A lens barrel comprising connecting means for selectively connecting a driving source to barrier means for opening and closing a front aperture of said lens barrel, said driving source being movable with a lens assembly provided in said lens barrel, said connecting means being normally displaced from said driving source when said lend assembly is moved toward a photographing state and being connected to said driving source when said lens barrel is moved to a collapsing state.

15. A lens barrel comprising barrier means for selectively covering an optical path and means for driving said barrier means for opening and closing a front aperture of said lens barrel responsive to means for indicating a change of position of said lens barrel to a collapsing state, said means for indicating comprising cam means and follower means responsive to movement along said cam means between said collapsing state and an extended state for coupling the barrier means to the driving means when the follower means reaches the extended state.

16. A lens driving apparatus comprising:

a holding frame for holding a lens;

lens driving means for moving said holding frame in an optical-axis direction;

barrier means for selectively covering and uncovering a front surface of a lens positioned at a tip of a lens barrel;

barrier driving means for opening and closing said barrier means;

driving means for selectively driving said lens driving means and said barrier means; and switching means for switching a driving force of said driving means in accordance with a position of said holding frame, said barrier means maintaining an open state and said switching means transmitting driving force of said driving means to said lens driving means to move said holding frame in an optical-axis direction responsive to movement of said holding frame to a photographing state, said switching means transmitting driving force of said driving means to said barrier means and operating said barrier means responsive to movement of said holding frame to a non-photographing state.

17. The lens driving apparatus according to claim 16 wherein said driving means includes an electric motor.

18. The lens driving apparatus according to claim 16 wherein said switching means includes cam means.

19. The lens driving apparatus according to claim 16 wherein said switching means includes a planet gear mechanism.

20. A lens driving apparatus comprising:

a driving apparatus;

barrier means for covering a lens surface at a tip of a lens barrel;

barrier driving means for driving said barrier means;

lens driving means for moving a lens holding frame in an optical-axis direction; and choosing means for choosing which one of said barrier driving means and said lens driving means is driven responsive to a position of said lens holding frame.

21. The lens driving apparatus according to claim 20 wherein said driving means includes an electric motor 22. The lens driving apparatus according to claim 20 wherein said selecting means includes cam means.

23. The lens driving apparatus according to claim 20 wherein said selecting means includes a planet gear mechanism.

24. A lens driving apparatus comprising:

electric driving means;

a photographing optical system;

barrier means for covering a lens front surface at a tip of a lens barrel;

barrier driving means for driving said barrier means;

a frame including at least said barrier means and being movable in an optical-axis direction of a lens;

lens driving means for selectively driving said photographing optical system and said moving frame; and switching means for switching a driving force of said electric driving means wherein, in a photographing state, said driving force output is coupled to said lens driving means responsive to movement of a lens frame to a photographing position to move said optical system in an optical-axis direction and wherein said driving force output is connected to said barrier driving means responsive to movement of a lens frame to a collapsed position for covering said lens surface at the tip of said optical system when said photographing optical system and said moving frame move to non-photographing states using said lens driving means.

25. The lens driving apparatus according to claim 24 wherein said electric driving means includes an electric motor.

26. The lens driving apparatus according to claim 24 wherein said switching means includes cam means.

27. The lens driving apparatus according to claim 24 wherein said switching means includes a planet gear mechanism.

28. A lens driving apparatus comprising:

electric driving means;

a photographing optical system;

barrier means for covering a lens front surface of a tip of a lens barrel;

barrier driving means for driving said barrier means;

a frame including at least said barrier means and being movable in an optical-axis direction of a lens;

lens driving means for driving said photographing optical system;

switching means for switching a driving force of said electric driving means, said electric driving means being able to drive said lens driving means in a photographing state and being able to drive said barrier driving means in a non-photographing state; and said lens driving means, when in a photographing state, moving said photographing optical system in an optical-axis direction, and said barrier means being connected to said barrier driving means and said barrier means covering a lens front surface at a tip of said optical system when said optical system and said moving frame are move to non-photographing states.

29. The lens driving apparatus according to claim 28 wherein said electric driving means includes an electric motor.

30. The lens driving apparatus according to claim 28 wherein said switching means includes cam means.

31. The lens driving apparatus according to claim 28 wherein said switching means includes a planet gear mechanism.

32. A lens driving apparatus comprising:

electric driving means;

a photographing optical system;

barrier means for covering a lens front surface at a tip of a lens barrel;

barrier driving means for driving said barrier means;

a frame including at least said barrier means and being movable in an optical-axis direction;

lens driving means for driving said photographing optical system and said moving frame;

switching means for switching a driving force of said electric driving means, said switching means coupling the driving force to only said lens driving means when the switching means is moved along the optical axis to a photographing state and coupling driving force to only said barrier driving means when the driving means is moved along the optical axis to a non-photographing state;

barrier connecting means for disconnecting said barrier means and said barrier driving means in a photographing state of said photographing optical system and for connecting said barrier means and said barrier driving means in a non-photographing state of said photographing optical system; and said lens driving means moving said photographing optical system in an optical-axis direction when said photographing optical system and said moving frame are in a photographing state, said driving force being transmitted to said barrier driving means and said driving means being connected to said barrier means by said barrier connecting means when said photographing optical system and said movable frame are in a non-photographing state, said barrier means covering the lens front surface at the tip of said photographing optical system.

33. The lens driving apparatus according to claim 32 wherein said electric driving means includes an electric motor.

34. The lens driving apparatus according to claim 32 wherein said switching means includes cam means.

35. The lens driving apparatus according to claim 32 wherein said switching means includes a planet gear mechanism.

36. The lens driving apparatus according to claim 32 wherein said barrier connecting means comprises a jaw clutch, said barrier means and said barrier driving means have one of opposing coupling elements of a jaw clutch.

37. A lens driving apparatus comprising:

driving means for driving a plurality of driven portions;

a photographing optical system;

photographing optical system driving means being one of said driven portions;

barrier means for selectively covering a front surface of said photographing optical system;

barrier driving means for opening and closing said barrier means being another one of said driven portions;

switching means for selectively switching a driving force of said driving means to one of said photographing optical system driving means and said barrier driving means; and barrier connecting means for selectively connecting said barrier means and barrier driving means responsive to a predetermined state of said photographing optical system.

38. The lens driving apparatus according to claim 37 wherein said driving means includes an electric motor.

39. The lens driving apparatus according to claim 37 wherein said switching means includes cam means.

40. The lens driving apparatus according to claim 37 wherein said switching means includes a planet gear mechanism.

41. The lens driving apparatus according to claim 37 wherein said barrier connecting means is made of a claw coupling and said barrier means and said barrier driving means have one of opposing elements of the claw coupling.

42. A lens barrel comprising:

at least one focusing lens;

barrier means arranged at one end of the lens barrel for selectively covering an aperture in the lens barrel;

barrier drive means for operating said barrier means;

focus means for driving said focusing lens in a direction of an optical axis;

electric drive means;

means for coupling an output of said barrier drive means to an input of said barrier means;

said output of said barrier drive means being separated from said input f said barrier means when said lens barrel is moved along the optical axis from a collapsed state in which photography is prevented to an extended state in which photography is performed.

43. The lens barrel of claim 42 wherein cam means are provided for moving said barrier means along said optical axis relative to said focusing lens to one of said collapsed and extended states independently of said electric drive means.

44. The lens barrel of claim 42 wherein one of said input and said output comprises a female member removably receiving a male member comprising another one of said input and output, said female member having a shape conforming to the male member to transmit drive therebetween.

45. The lens barrel of claim 42 wherein said output and said input comprise a driver and a coupling member, one of said driver and coupling member having a projection of a predetermined shape and the other one of said driver and coupling member having a concave portion conforming to the shape of the projection for releasably receiving said projection whereby power is transmitted to said barrier means when the driver is received in said coupling member.

46. The lens barrel of claim 45 wherein said input and output are separated when said focusing lens and barrier means are displaced from one another in a direction along the optical axis in said photographing state and said input and output are coupled when said focusing lens and barrier means are moved close to one another in said non-photographing state.

47. The lens barrel of claim 46 further comprising switching means coupling said electric driver means to said barrier drive means responsive to a non-photographing state and coupling said electric driver means to said focus means responsive to said photographing state.

48. The lens driving apparatus of claim 36 wherein said opposing coupling elements are coupled when the photographing optical system is moved to a non-photographing state and are decoupled when the photographing optical system is in a photographing state.

49. A lens barrel according to claim 1 further comprising:

said photographing optical system including at least first and second movably mounted lens groups; and cam means for moving said lens groups between a collapsed position corresponding to said state incapable of photographing and an extended position corresponding to said state capable of photographing; and said driving source being mounted to move with one of said movably mounted lens groups.

50. A lens barrel according to claim 49 wherein said shading means, driving source and said barrier means are movably mounted along said lens barrel, said cam means including means for moving said barrier means and barrier driving means;

said driving source having an output and said shading means driving mechanism having an input, said input and output being coupled to one another when said cam means moves the optical system to the collapsed position and being displaced from one another when said cam means moves said optical system to said extended position.

51. A lens barrel according to claim 49 wherein said driving source comprises a motor and said switching means comprises a sun gear and means coupled to an output of said motor for rotating said sun gear;

a planetary gear meshing with and rotatable about said sun gear;

first coupling gear means for coupling a driving force of said motor to said shading means driving mechanism when said first coupling gear means engages said planetary gear;

second coupling gear means for coupling a driving force of said motor to said lens group driving mechanism when said second gear coupling means engages said planetary gear; and a switching arm movable between a first position to move said planetary gear into engagement with said first coupling gear means and a second position to move said planetary gear into engagement with said second coupling gear means;

switching cam means responsive to movement of said lens group driving mechanism relative to said switching cam means for moving said switching arm to said first position when said lens barrel is in said collapsed position and for moving said switching arm to said second position when said lens barrel is in said extended position.

52. A lens barrel according to claim 51 wherein said switching cam means comprises a cam groove having first and second linear cam groove portions provided in a linearly movable float key movable by said cam ring, said first and second linear cam groove portions arranged substantially parallel to the optical axis and being joined to one another by a curved, intermediate cam groove portion; and an end of said switching arm extending into said cam groove for causing said planetary gear to selectively engage one of said coupling gear means according to the position of said switching arm along said cam groove.

53. A lens driving apparatus according to claim 14 wherein one of said connecting means and driving source comprises a male member and the other of said connecting means and driving source comprises a female member for removably receiving said male member in the collapsed state and being displaced from the male member in the photographing state.

54. A lens driving apparatus according to claim 53 wherein said male member comprises a projection having a substantially rectangular-shaped cross-section and said female member has an opening receiving said projection and having a shape conforming to the cross-sectional shape of said projection.

\* \* \* \* \*